March 1, 1955  E. M. WILLIAMS ET AL  2,703,399
APPARATUS FOR GUIDING AND DETONATING MISSILES
Filed Feb. 15, 1946
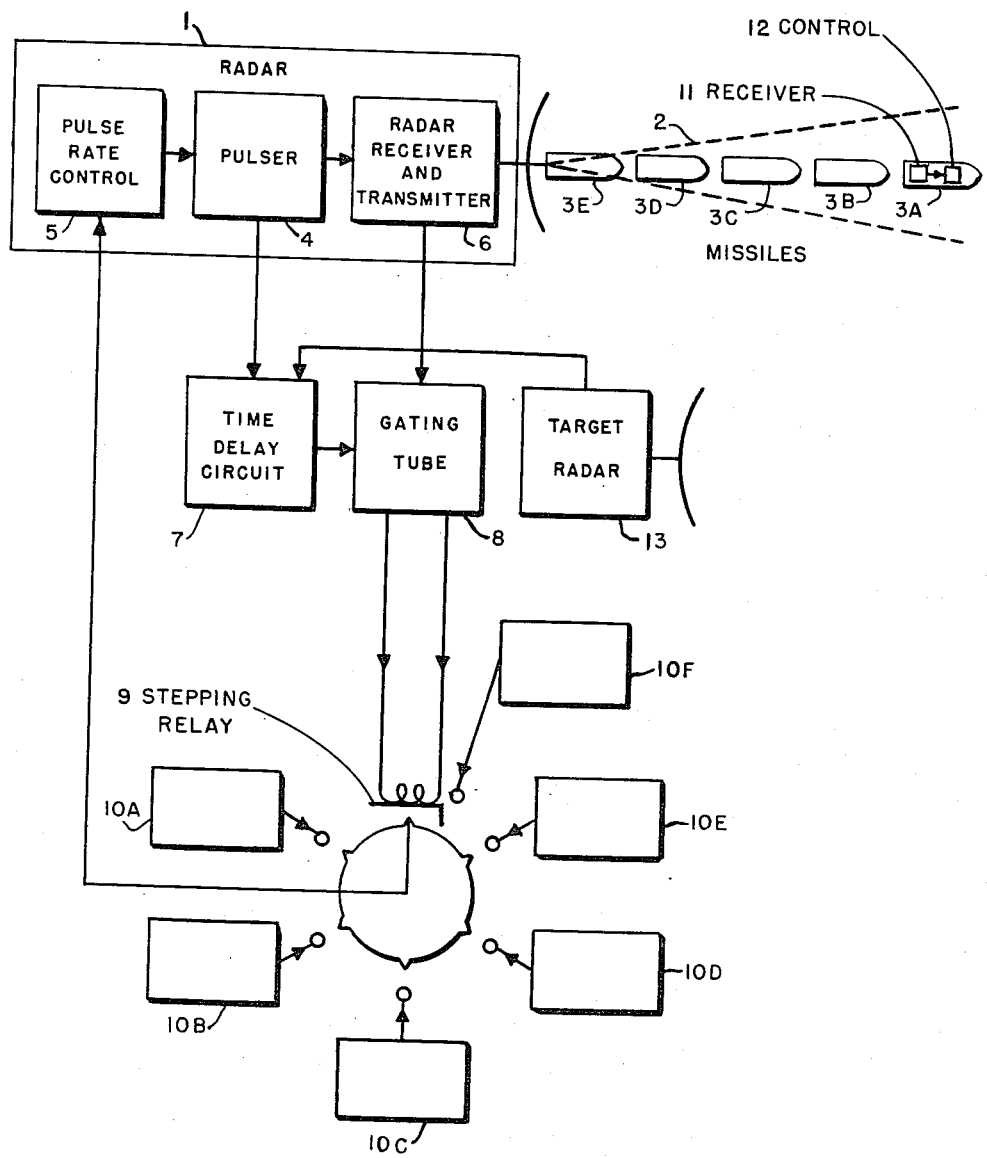
INVENTORS
EVERARD M. WILLIAMS
BY   EDWIN V. COUSY
*Harry M. Saragovitz*
ATTORNEY

United States Patent Office 2,703,399
Patented Mar. 1, 1955

2,703,399

APPARATUS FOR GUIDING AND DETONATING MISSILES

Everard M. Williams, Pittsburgh, Pa., and Edwin V. Cousy, New York, N. Y.

Application February 15, 1946, Serial No. 647,980

7 Claims. (Cl. 343—7)

(Granted under Title 35, U. S. Code (1952), sec. 266)

The invention described herein may be manufactured and used by or for the Government for governmental purposes, without the payment to us of any royalty thereon.

Our invention relates to the radio control of missiles, and in particular to a radar system for detonating in turn a train of missiles when each reaches a predetermined range.

It is an object of our invention to provide a remote control for detonating a missile.

Another object of our invention is to provide a method of operating a control when a remote controlled object has reached a predicted range.

Another object of our invention is to operate controls of a train of missiles fired in succession when each reaches a predicted range.

Another object of our invention is to provide means for the release or dumping of radar controlled missiles at a preset range.

For an explanation of our invention reference is made to the sole drawing, in which there is shown in block diagram a system for releasing the detonating mechanism of a series of missiles embodying our invention.

In the drawing there is shown a radar 1 projecting a narrow beam 2. Within this beam there is shown a train of five missiles 3A, 3B, 3C, 3D, 3E in flight. Within radar 1 there are indicated usual components pulser 4, pulse rate control 5, radar receiver and transmitter 6.

There is shown a time delay circuit 7 receiving pulses from pulser 4 and passing them on after a predetermined delay to gating tube 8. Gating tube 8 is shown receiving the output of the receiver of radar receiver and transmitter 6 and passing a control signal to stepping relay 9.

Stepping relay 9 is shown with six positions connecting six tone generators 10A, 10B, 10C, 10D, 10E, 10F in succession to pulse rate control 5. Each generator generates a distinct frequency, which becomes each in turn the pulse repetition rate. These rates will be designated as A, B, C, D, E, F respectively. In practice these may be one tone generator with six different settings of frequency.

In missile 3A there is shown a radar receiver 11 and a release 12 receiving the detected output of receiver 11. Similar receivers and releases are to be understood as incorporated in the other missiles. The audio channel of receiver 11 in missile 3A is selectively tuned to the pulse repetition rate A of tone generator 10A, and the audio channel of the receiver in each other missile is tuned to the frequency of the tone generator lettered similarly to the missile.

In operation the train of missiles is started with stepping relay 9 connecting tone generator 10F to pulse rate control 5 so that the pulse rate of beam 2 is the frequency F of generator 10F, a frequency to which none of the audio channels in the receivers in the missiles is responsive. This pulse rate may vary rather widely and still serve to permit the control of the missiles by means such as those disclosed in British patent Sperry 524,876. Suitable radar means for tracking the target and guiding and ranging on the projectile are illustrated in British patent to Standard Telephone & Cable (International Standard Electric Corp.) 555,072. The time delay circuit 7 is adjusted to introduce a delay into the pulse from pulser 4 equal to the echo time of a radar pulse reflected from one of the missiles when such a missile reaches the predetermined range for detonation. This adjustment may be independently controlled by hand from data obtained by the radar apparatus or automatically by appropriate connection to the range elements of the radar or an associated range predictor such as that shown in patent to Doyle 2,399,726. The target radar and predictor 13 are used in SCR 584, a well known anti-aircraft fire control radar system a detailed description of which is to be found in War Department Technical Manuals TM 11–1524 of March 10, 1944, and July 1946. Improved means for guiding and determining the proper range of detonation are also disclosed in our above-identified copending application. The pulse from time delay circuit 7 and the detected echo pulse from radar receiver and transmitter 6 are both received on gating tube 8, which is so designed that no signal is passed by the tube unless both pulses are received simultaneously. Gating tube 8 may be a thyratron with sufficient negative bias on the control grid that it will not fire unless pulses from time delay circuit 7 and radar receiver and transmitter 6 are both present to drive the bias positive. Gating tube 8 supplies a control pulse to stepping relay 9 of sufficient length to operate the relay and longer than the pulse rate period. Thus, at the moment missile 3A reaches the detonating range, stepping relay 9 removes tone generator 10F from circuit and connects in tone generator 10A. Stepping relay 9 is of the type which will move only one step no matter how long the pulse in the coil. The radar pulse thereupon changes from rate F to rate A. The radar signal received in receiver 11 in missile 3A is passed by the audio channel therein selectively tuned to pulse rate A and release 12 is activated and the missile 3A is detonated.

The missile 3A upon detonation is removed from the radar beam, and gating tube 8 will cease to pass detected echo pulses from receiver and transmitter 6 because all the reflected echoes are from too short ranges. However, when the succeeding missile 3B comes into range gating tube 8 a second times passes a control signal to relay 9, which moves up a step, disconnecting tone generator 10A and connecting in circuit tone generator 10B. Thus the radar pulses change to frequency B which is passed through the receiver of missile 3B to the release therein and the missile is detonated. Thus each missile in turn is detonated at the predetermined range. It is possible of course for the predetermined range to be changed during the flight of the missiles and it need not be the same for all the missiles.

It is noted that the particular adaptation, arrangements, circuits and individual components that have been shown and described herein have been submitted for the purposes of illustrating and describing suitable representative embodiments of the present invention and that similarly operating modifications, substitutions, and changes may be made therein without departure from the scope of the present invention as defined by the appended claims.

Having thus described my invention, what I claim and desire to protect by Letters Patent is:

1. In a radio object location system for guiding at least one missile by means of transmitted pulses of radio frequency energy which are reflected from said missile to be received as echo pulses by said system and indicate the distance therefrom of said missile, the combination of means for delaying pulses applied thereto by the transmitter portion of said system for a given interval of time corresponding to a predetermined target range, normally deactivated gating switch means receptive of said echo pulses received by said system and also receptive of the delayed pulses from said delaying means, said gating switch means being activated by a coincidence between the delayed pulses and the echo pulses, control means connected to and operated by the activation of said gating switch means for varying a property of the pulses transmitted by said system, and means in said missile responsive to the variation of said property of said transmitted pulses for detonating said missile.

2. The combination of claim 1, further including means for varying the delay time of said delaying means, thereby varying the detonation point of said missile.

3. The combination of claim 1, wherein said control means successively varies said property of said pulses transmitted by said system in a different one of a plurality of ways, thereby enabling a plurality of guided missiles, each responsive to a different one of the variations of the transmitted pulses, to be successively detonated at said predetermined target range.

4. The combination of claim 3, further including means for varying the delay time of said delaying means in accordance with said target range.

5. The combination of claim 4, wherein the pulse repetition rate is the property of the transmitted pulses that is varied, said control means including a plurality of generators of different frequencies and selector switch means connected and responsive to said gating switch means for successively connecting a different one of said generators to said system and successively changing the pulse repetition rate of the transmitted pulses as each missile is successively detonated.

6. The combination of claim 5, wherein said selector switch means comprises a step relay.

7. The combination of claim 6, wherein said means for varying the delay time comprises radio object location means for tracking said target.

References Cited in the file of this patent

UNITED STATES PATENTS

| | | |
|---|---|---|
| 2,333,688 | Shepard | Nov. 9, 1943 |
| 2,404,942 | Bedford | July 30, 1946 |
| 2,409,462 | Zworykin | Oct. 15, 1946 |
| 2,451,917 | Chilowsky | Oct. 19, 1948 |
| 2,459,482 | Bond | Jan. 18, 1949 |
| 2,557,401 | Agins et al. | June 19, 1951 |
| 2,557,949 | Deloraine | June 26, 1951 |
| 2,594,305 | Haller | Apr. 29, 1952 |

FOREIGN PATENTS

| | | |
|---|---|---|
| 91,592 | Sweden | Feb. 24, 1938 |